*Potts & Klett.*

*Making Superphosphate of Lime.*

N° 45,631.   Patented Dec. 27, 1864.

Witnesses:
C. L. Topliff
Henry Morris

Inventor:
R. B. Potts
F. Klett
per Munn & Co
Attorneys

UNITED STATES PATENT OFFICE.

ROBERT B. POTTS AND FREDERICK K. KLETT, OF CAMDEN, NEW JERSEY.

IMPROVED APPARATUS FOR THE MANUFACTURE OF SUPERPHOSPHATE OF LIME.

Specification forming part of Letters Patent No. 45,631, dated December 27, 1864.

*To all whom it may concern:*

Be it known that we, ROBT. B. POTTS and FREDK. KLETT, of Camden, in the county of Camden and State of New Jersey, have invented a new and useful Improvement in the Manufacture of Superphosphate of Lime; and we do hereby declare that the following is a full, clear, and exact description thereof, which will enable others skilled in the art to fully understand and use the same, reference being had to the accompanying drawings, forming part of this specification, in which—

Figure 1:
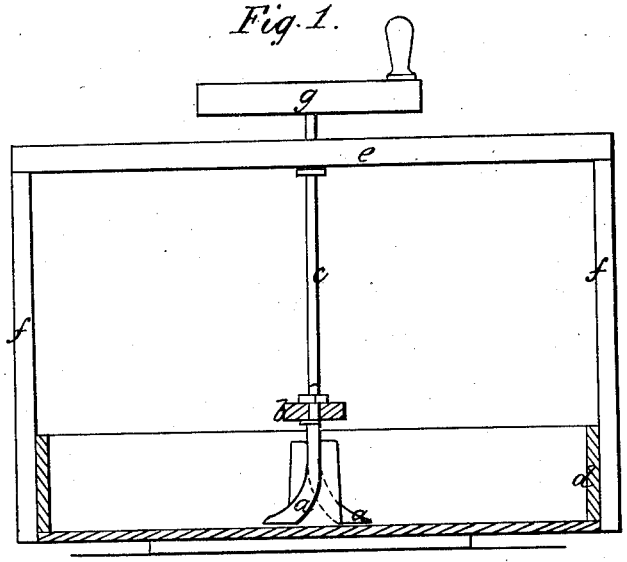
Figure 2:
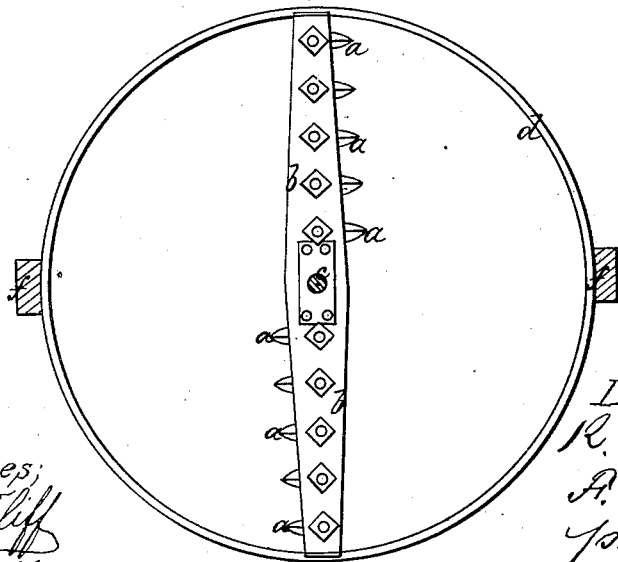

Figure 1 represents a vertical central section of the apparatus which we use in carrying out our invention. Fig. 2 is a sectional plan or top view of the same.

Similar letters of reference indicate like parts.

The usual method of manufacturing superphosphate of lime is by treating bone-ash or basic phosphate of lime with sulphuric acid. The quantity of sulphuric acid employed depends upon the state of purity and upon the composition of the bone-ash. If the bone-ash is one-third basic phosphate of lime, $(3CaO_1 PO_5,)$ two equivalents of sulphuric acid have to be added and the result is expressed as follows:

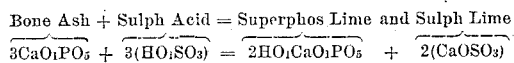

$$3CaO_1PO_5 + 3(HO_1SO_3) = 2HO_1CaO_1PO_5 + 2(CaOSO_3)$$

If the sulphuric acid is added to the bone-ash, the formation of the sulphate of lime or plaster-of-paris is very rapid, and this material hardens quickly and forms a great obstacle in the manufacture of the superphosphate. This obstacle is effectually overcome by the use of our apparatus, which is driven by a steam-engine or other source of power, and which serves to agitate and stir up the bone-ash while the sulphuric acid is being added, and thereby the sulphate of lime is prevented from combining into compact lumps and the bone-ash is readily and easily transformed into superphosphate.

The apparatus which we have used with perfect success is represented in the drawings. It consists in a series of plows, *a*, which are attached to arms *b*, extending in a horizontal direction from a vertical arbor, *c*. This arbor is stepped in a suitable socket in the center of the vat *d* and its upper part has its bearing in a box attached to or formed by a crossbar, *e*, which is supported by two uprights, *f*, and extends across the center of the vat. A suitable pulley, *g*, serves to impart motion to the shaft and to the plows. The points of the plows sweep close over the bottom of the vat, the interior of which may be lined with lead to counteract the influence of the sulphuric acid. By the action of the plows the sulphate of lime is prevented forming into lumps and the decomposition of the basic phosphate or bone-ash is effected in a short time and perfectly uniform throughout the whole mass.

It is obvious that the apparatus hereinbefore described, and illustrated in the drawings, can be changed in various different ways without materially altering the result. The form, number, and position of the plows could be changed, and, instead of imparting a continuous rotary motion to the vertical shafts, a reciprocating rotary or a vibrating motion might be imparted to it, the number of the horizontal arms might be increased, and the vat, instead of being round, might be made square or in any desirable form.

We do not wish to confine ourselves, therefore, to the precise shape and construction of the apparatus above described, and we reserve the right to make such changes in the construction of the same as may appear desirable.

We claim as new and desire to secure by Letters Patent—

The use, in the manufacture of superphosphate of lime, of an agitator, *a b*, and tank *d*, substantially as herein shown and described, and capable of being driven by power, as set forth.

ROBT. B. POTTS.
FRED. KLETT.

Witnesses:
B. M. RHODE,
P. C. BUDD.